(12) United States Patent
Pribyl

(10) Patent No.: US 9,254,960 B2
(45) Date of Patent: Feb. 9, 2016

(54) SINGLE MOTOR DUAL BELT CONVEYOR DRIVE

(71) Applicant: Paul Pribyl, Mequon, WI (US)

(72) Inventor: Paul Pribyl, Mequon, WI (US)

(73) Assignee: JORGENSEN CONVEYORS, Mequon, WI (US)

( * ) Notice: Subject to any disclaimer, the term of this patent is extended or adjusted under 35 U.S.C. 154(b) by 0 days.

(21) Appl. No.: 13/921,251

(22) Filed: Jun. 19, 2013

(65) Prior Publication Data

US 2014/0311868 A1    Oct. 23, 2014

Related U.S. Application Data

(60) Provisional application No. 61/813,004, filed on Apr. 17, 2013.

(51) Int. Cl.
| | | |
|---|---|---|
| *B65G 15/16* | (2006.01) | |
| *B65G 15/12* | (2006.01) | |
| *B65G 17/10* | (2006.01) | |
| *B65G 23/00* | (2006.01) | |

(52) U.S. Cl.
CPC ............... *B65G 15/12* (2013.01); *B65G 15/16* (2013.01); *B65G 17/10* (2013.01); *B65G 23/00* (2013.01)

(58) Field of Classification Search
CPC ................................. B65G 15/20; B65G 15/16
USPC ............................ 198/607, 626.1–626.6, 832
See application file for complete search history.

(56) References Cited

U.S. PATENT DOCUMENTS

| | | | | |
|---|---|---|---|---|
| 4,192,639 A | * | 3/1980 | Jones, Jr. ....................... | 198/607 |
| 4,406,359 A | * | 9/1983 | Cole et al. .................. | 198/626.1 |
| 4,779,715 A | * | 10/1988 | Pazdernik ..................... | 198/436 |
| 5,186,310 A | * | 2/1993 | Winchester ................ | 198/626.5 |
| 5,435,433 A | * | 7/1995 | Jordan et al. .............. | 198/626.5 |
| 5,996,769 A | * | 12/1999 | Winchip ..................... | 198/626.4 |
| 6,003,659 A | * | 12/1999 | Uranaka et al. ............. | 198/626.1 |

FOREIGN PATENT DOCUMENTS

| | | |
|---|---|---|
| GB | 723380 A | 2/1955 |
| GB | 964334 A | 7/1964 |
| GB | 1216020 A | 12/1970 |

OTHER PUBLICATIONS

PCT International Search Report and Written Opinion, PCT/US2014/034457, Aug. 22, 2014, 10 pages.

* cited by examiner

*Primary Examiner* — James R Bidwell
(74) *Attorney, Agent, or Firm* — Quarles & Brady LLP

(57) ABSTRACT

A conveyor system for controlling two conveyer belts with a single motor comprises a housing including at least one inclined section. A first conveyor belt is operably connected to a drive pulley and a first idler pulley. A second conveyor belt is operably connected to a second and third idler pulley. A drive unit includes a motor in communication with the drive pulley and a first and a second sprocket. A roller chain extends between the drive pulley, the sprockets, and the third idler pulley, wherein the roller chain causes the drive pulley and the sprockets to rotate in one of a clockwise and a counterclockwise manner and the third idler pulley to rotate in the other of a clockwise and the counterclockwise manner.

28 Claims, 12 Drawing Sheets

SINGLE MOTOR DUAL BELT CONVEYOR DRIVE

CROSS-REFERENCE TO RELATED APPLICATIONS

This application is based on U.S. Provisional Patent Application Ser. No. 61/813,004 filed on Apr. 17, 2013 and entitled "SINGLE MOTOR DUAL BELT CONVEYOR DRIVE."

STATEMENT REGARDING FEDERALLY SPONSORED RESEARCH OR DEVELOPMENT

Not applicable.

BACKGROUND OF THE INVENTION

The field of the invention is a drive system, and more specifically a drive system that has a single motor designed to control two conveyors.

Industrial conveyor systems have been utilized to transport a variety of components including, for example, waste metal and other scrap. Conventional conveyor systems typically utilize a plurality of conveyors, wherein each conveyor is powered by a motor. In one particular instance, a "sandwich" conveyor includes two conveyors oriented adjacent each other to form a gap there between. Material is pulled into the gap and held tightly between the conveyors as the material is transported through the sandwich conveyor. Sandwich conveyors allow heavy material to be transported upwardly at a significant pitch. Sandwich conveyor systems require significant amounts of power to pull the material up the incline, particularly when the material is heavy.

In many instances, existing conveyor systems are often designed to attempt to overcome the aforementioned problems through the use of various motors or through various conveyor system configurations. In some instances, one motor is supplied to power each conveyor belt. In other instances, one motor is supplied to provide power to more than one conveyor belt, but such conveyor belts do not include severe inclines. In further instances, one motor is provided that supplies power to more than one conveyor belt, but the motor must operate at extreme operating conditions to be capable of supplying the required amount of power that drives the conveyor belts.

While existing systems and techniques for operating more than one conveyor belt using a single motor work well in some applications, unfortunately known systems have several shortcomings. First, the use of more than one motor in conventional conveyor systems increases power consumption, which increases capital, operational, and maintenance costs associated with the conveyor system. Second, many conveyor systems are restricted to conveyor belts having gradual inclines. These systems take up significantly more space and resources due to their "switchback" setup. Third, many single motor systems that operate at upper limits of the motors capacity burn out quickly and are inefficient. In these instances, the motors must be replaced more frequently.

BRIEF SUMMARY OF THE INVENTION

It has been recognized that the disadvantages associated with using a motor associated with each belt conveyor can be substantially overcome by providing a drive unit with a motor, a series of pulleys and sprockets, and a roller chain that controls two conveyor belts. The motor directly supplies power to one conveyor belt, while the roller chain provides mechanical power to drive a second conveyor belt.

In some cases, the conveyor system includes a housing including at least one inclined section. A first conveyor belt is operably connected to a drive pulley and a first idler pulley. A second conveyor belt is operably connected to a second and third idler pulley. A drive unit includes a motor in communication with the drive pulley and a first and a second sprocket. A roller chain extends between the drive pulley, the sprockets, and the third idler pulley, wherein the roller chain causes the drive pulley and the sprockets to rotate in a clockwise manner and the third idler pulley to rotate in a counterclockwise manner.

In some cases, a method of operating a sandwich belt conveyor system includes the steps of providing a housing having an inclined section of greater than about 50 degrees and a discharge opening at a terminal end, providing a first and a second conveyor belt, wherein the first conveyor belt extends substantially the entire length of the housing and terminates at the discharge opening and the second conveyor belt is positioned in the inclined section and terminates at the discharge opening. Power is supplied directly to the first conveyor belt via a motor to rotate the first conveyor belt in one of a clockwise direction and a counterclockwise direction, and power is supplied indirectly to the second conveyor belt via a roller chain to rotate the second conveyor belt in the other of a clockwise direction and the counterclockwise direction.

These and other objects, advantages, and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE DISCLOSURE

Figure 1:
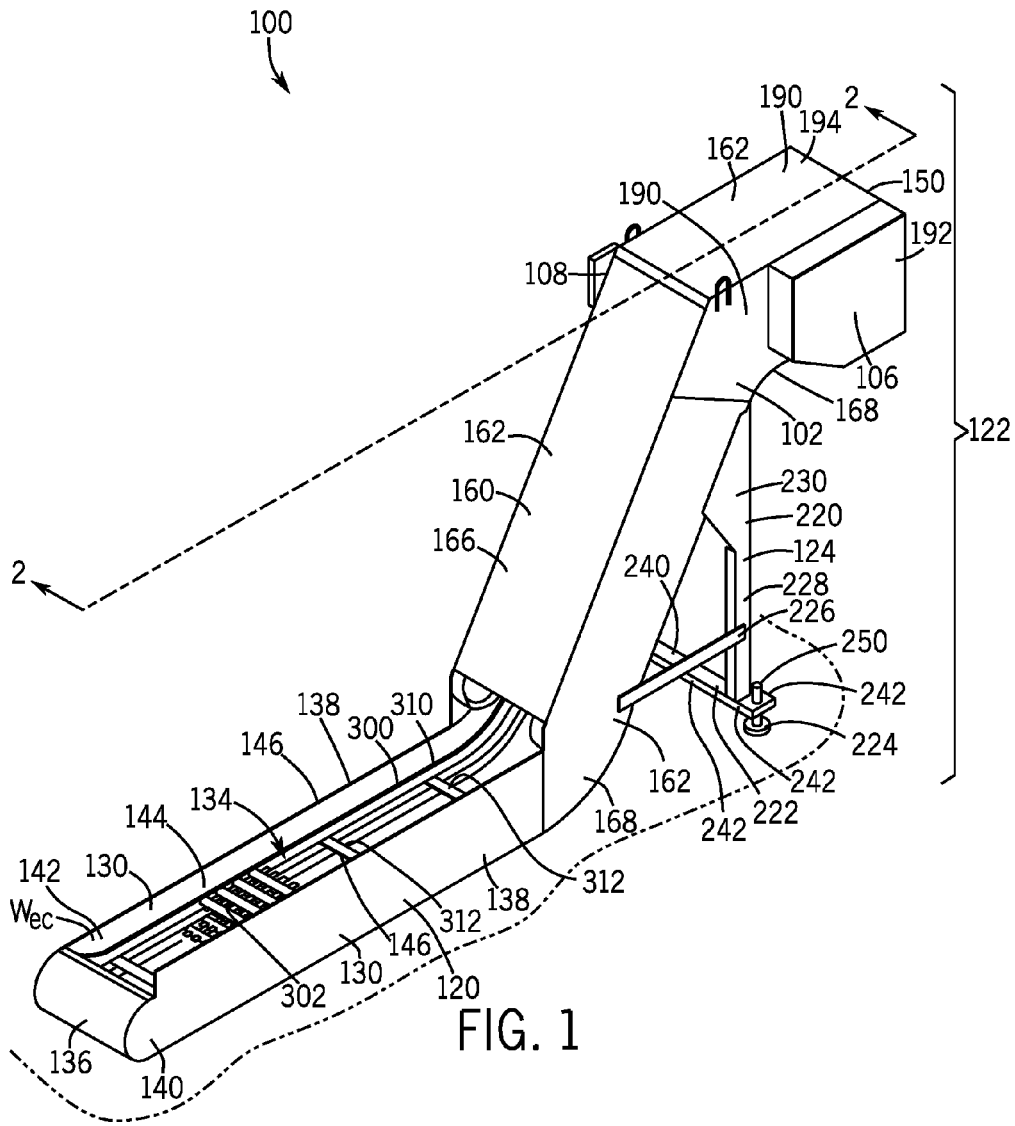
FIG. 1 is a front isometric view of a conveyor system having a housing, two conveyor belts, a drive unit, and a controller that is consistent with at least some aspects of the present invention.

One or more specific embodiments of the present disclosure will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the figures wherein like reference numerals correspond to similar elements throughout the several views and more specifically referring to FIGS. 1-12, an exemplary single motor dual belt conveyor system 100 includes a housing 102, two conveyor belts 104a, 104b, a drive unit 106, and a controller 108.

Figure 2:
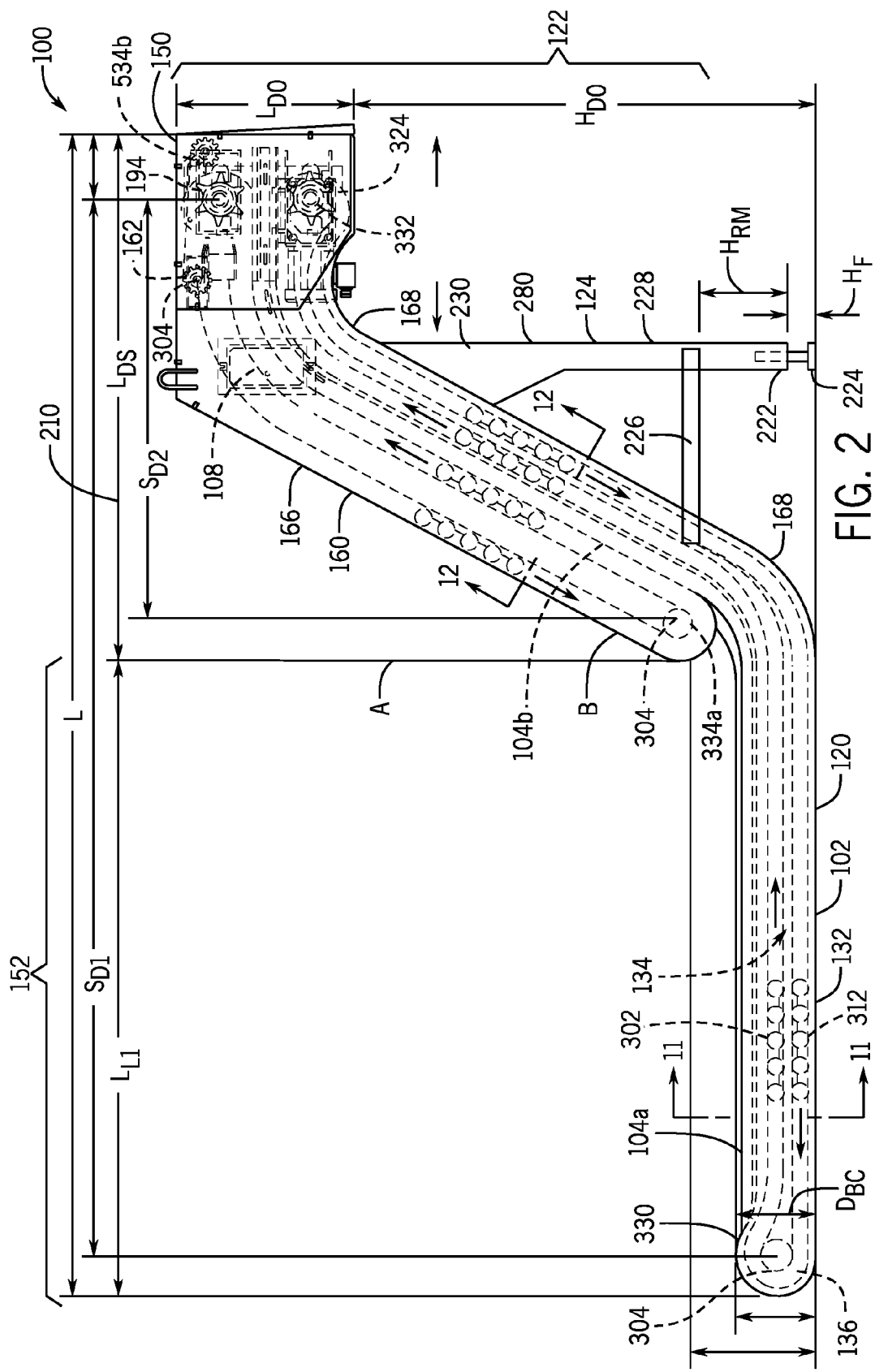
FIG. 2 is a partial cross-section view of the conveyor system of FIG. 1 taken along line 2-2 of FIG. 1, wherein portions of the conveyor system have been removed for clarity.
Figure 3:
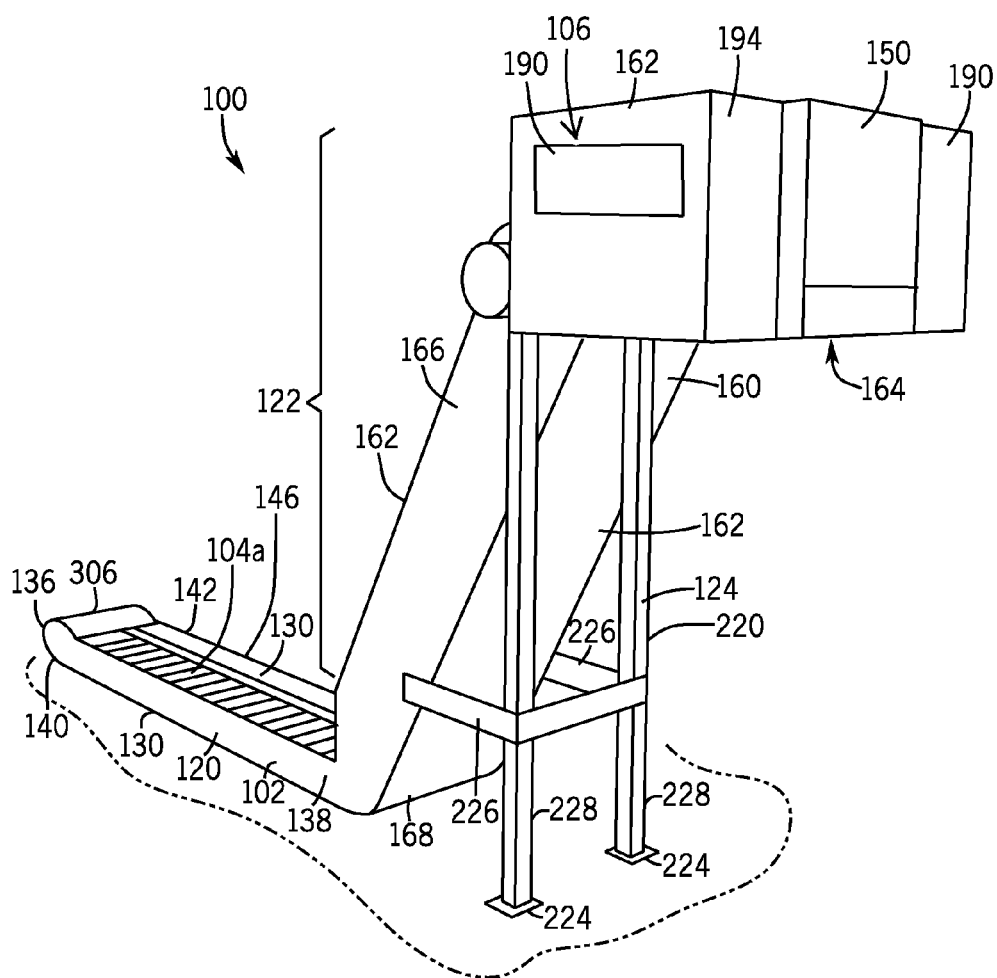
FIG. 3 is a rear isometric view of a conveyor system that is consistent with at least some aspects of the present invention.
Figure 4:
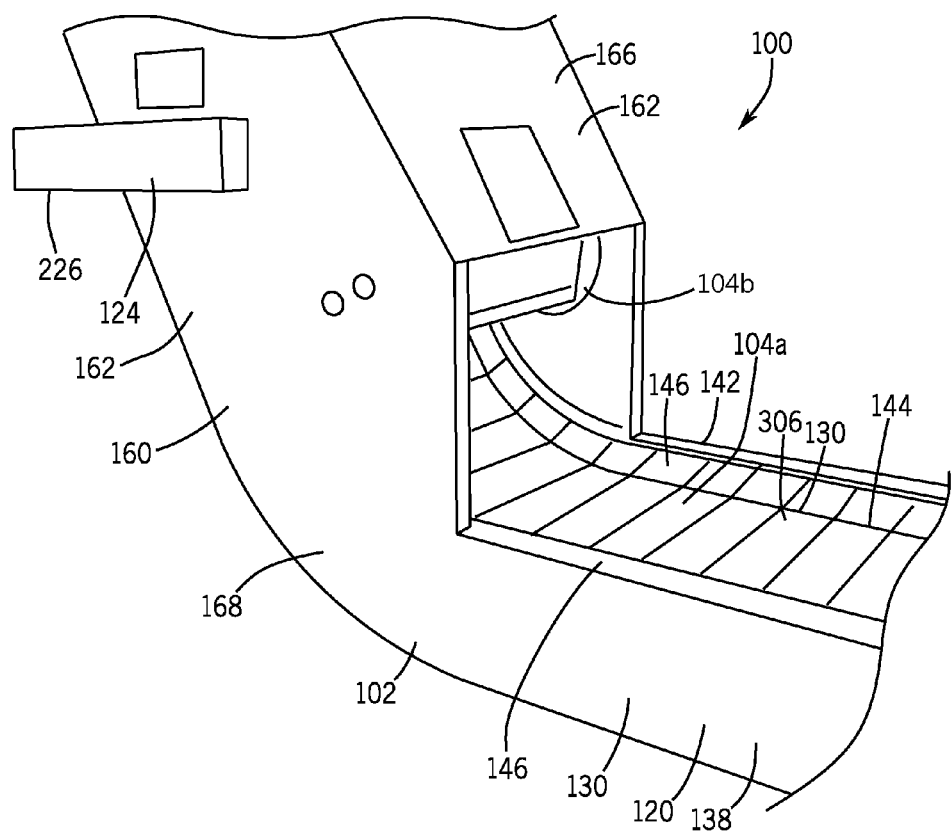
FIG. 4 is an enlarged isometric view of a first conveyor belt and a second conveyor belt configured in a sandwich manner.

Referring specifically to FIGS. 1-3, exemplary housing 102 includes a lower housing 120, an upper enclosed housing 122, and a support frame 124. Lower housing 120 includes two sidewalls 130, a horizontal wall 132 connecting the sidewalls 130, a belt cavity 134, and an end cap 136. The two vertical sidewalls 130 are spaced in parallel orientation with respect to each other and are joined by the horizontal wall 132 along lower edges thereof. The vertical sidewalls 130 are each formed by substantially rectilinear panels 138 that terminate at curved ends 140. Slightly rounded ridges 142 are provided on interior surfaces 144 of each of the panels 138 adjacent top edges 146 and extend substantially along the length thereof.

The horizontal wall 132 joins the vertical sidewalls 130 to form a unitary structure. The horizontal wall 132 is substantially flat and forms a lower boundary of the belt cavity 134. The horizontal wall 132 is attached along the length thereof and is made from the same materials as the vertical sidewalls 130.

In one instance, the walls 130, 132 are integral with respect to each other. In other instances, the walls 130 may be separate components that are welded together or otherwise joined to form a cohesive housing 102.

The walls 130, 132 collectively define the belt cavity 134, which is designed to receive and support the conveyor belt 104a and various associated components. The belt cavity 134 extends the length of the conveyor belt 104a. In one instance, the belt cavity 134 extends from the end cap 136 through both the lower housing 120 and upper enclosed housing 122 before terminating at a terminal end 150 of the conveyor system 100. In some instances, the belt cavity 134 includes a depth dimension $D_{BC}$ (see FIG. 2) of between about 5 cm to about 40 cm. In one particular instance, the depth dimension $D_{BC}$ of the belt cavity 134 is about 28 cm. The belt cavity 134 also includes a width dimension $W_{BC}$ of between about 10 cm to about 60 cm. In one specific instance, the width dimension $W_{BC}$ of the belt cavity 134 is about 30 cm. In other instances, the belt cavity 134 includes a depth dimension $D_{BC}$ of between about 5 cm to about 500 cm. In further instances, the width dimension $W_{BC}$ of the belt cavity 134 is between about 5 cm to about 500 cm. It should be appreciated that the dimensions of the belt cavity 134 may vary depending on the design requirements of the conveyor system 100.

As best seen in FIG. 1, one end of the lower housing 120 is enclosed via the protective end cap 136. The end cap 136 is formed of a rigid material and includes a rounded profile. The end cap 136 protects a portion of the conveyor belt 104a and various associated components. In one instance, the end cap 136 is integral with the horizontal wall 132 and/or vertical walls 130. In another instance, the end cap 136 forms a separate component of the lower housing 120.

In at least some cases, the walls 130, 132 and/or end cap 136 are provided as rigid members and can be formed of any suitable materials including metals such as steel.

Referring to FIG. 2, the lower housing 120 defines a load section 150, which is where material (not labeled) enters the conveyor system 100. The load section 152 extends from the terminal edge of the end cap 136 to an axis A formed by the intersection of the lower housing 120 and the upper enclosed housing 122. In some instances, the load section 152 includes a length dimension $L_{LS}$ of between about 150 cm to about 200 cm. In other instances, the load section 152 includes a length dimension $L_{LS}$ of between about 10 cm to about 10,000 cm. In one instance, the length dimension $L_{LS}$ is about 180 cm. In some instances, the load section 152 further includes a width dimension $W_{BC}$ of between about 10 cm to about 60 cm. In other instances, the load section 152 includes a width dimension $W_{BC}$ of between about 5 cm to about 800 cm. In one instance, the width dimension $W_{BC}$ is about 30 cm.

Now turning to FIGS. 1-5, lower housing 120 is in communication with the upper enclosed housing 122. Upper enclosed housing 122 is defined by an inclined section 160, a drive unit housing 162, and a discharge opening 164.

The inclined section 160 is formed by four rigid walls 162 that define a substantially cubic enclosure 166. The walls 162 are substantially flat except for two curved sections 168 that connect the inclined section 160 to the lower housing 120 and drive unit housing 162. In some instances, each of the walls 162 are inclined such that the inclined section 160 of the upper housing 122 is disposed at a pitch with respect to axis A at an angle B of about 30 degrees to about 100 degrees. In one instance, the walls 162 extend upwardly at an angle of about 60 degrees. It should be appreciated that the inclined section 160 may be disposed at other angles depending on the specific design requirements of the conveyor system 100.

Figure 12:
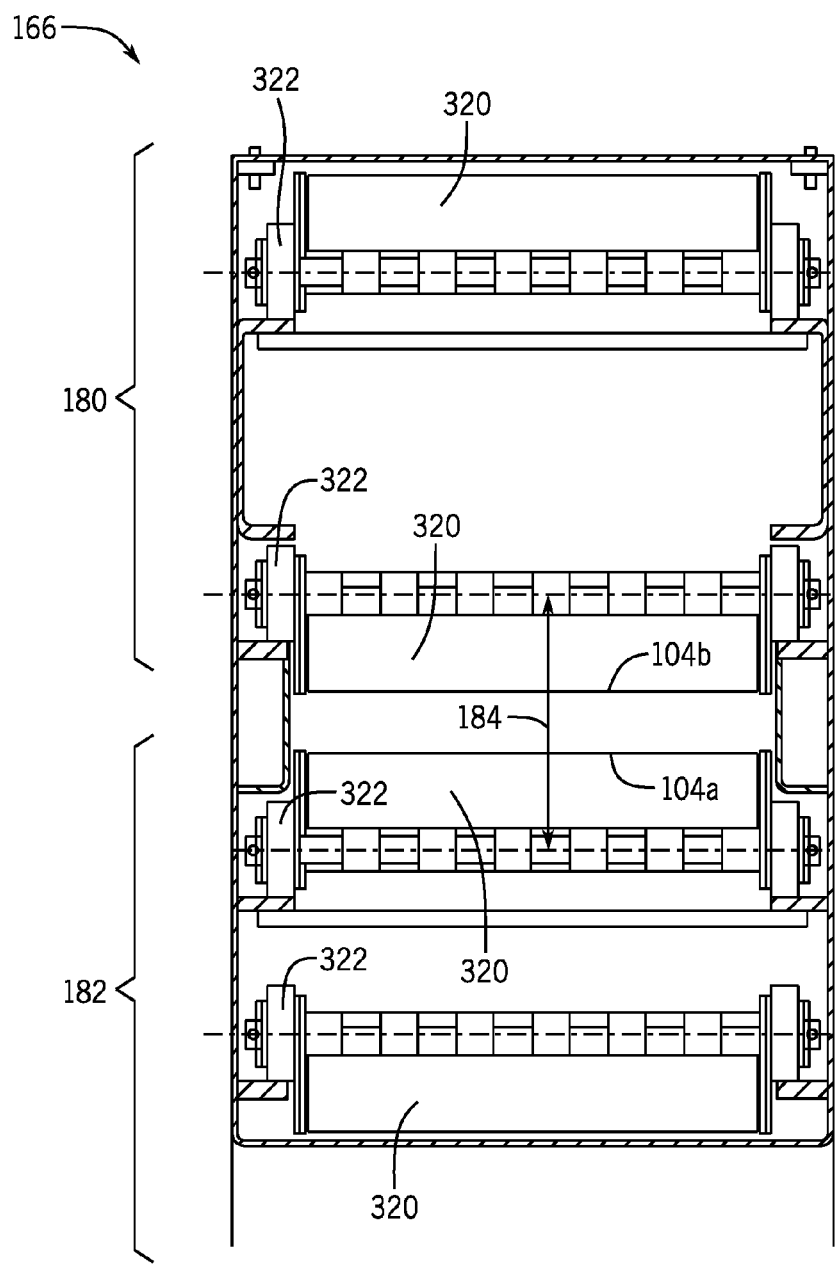
FIG. 12 is a partial cross-sectional view of the conveyor system of FIG. 2 taken along line B-B of FIG. 2, wherein portions of the conveyor system have been removed for clarity.

As shown in FIG. 12, the cubic enclosure 166 is divided into an upper section 180 and a lower section 182 with a gap 184 there between. The cubic enclosure 166 is designed to support and enclose portions of conveyor belts 104a, 104b. In particular, various components of the conveyor belts 104a, 104b are mounted to internal surfaces of the cubic enclosure 166. In some instances, the upper section 180 forms between about 45% to about 49% of the cubic volume of the inclined section 160. Similarly, in some instances, the lower section 182 forms between about 45% to about 49% of the cubic volume of the inclined section 160. The gap 184 is formed between the two conveyor belts 104a, 104b (see FIG. 12).

The inclined section 160 extends upwardly and is integral with the drive unit housing 162. The drive unit housing 162 includes four substantially flat walls 190 and ancillary enclosures 192. The flat walls 190 define a secondary cubic enclosure 194 that is similar in function to the cubic enclosure 166. Specifically, various components of the conveyor belts 104a, 104b and drive unit 106 are mounted to internal surfaces of the secondary cubic enclosure 194.

The ancillary enclosures 192 protrude outwardly from opposing external surfaces of the drive unit housing 162. The ancillary enclosures 192 are shaped to correspond to various components of the drive unit 106. In particular, the ancillary enclosures 192 are shaped such that the drive unit 106 components are mounted to internal surfaces thereof and are in communication with various parts of the conveyor belts 104a, 104b.

The discharge opening 164 is provided at the terminal end 150 of the upper enclosed housing 122. The discharge opening 164 allows processed material to exit the conveyor system 100. The discharge opening 164 is provided as a void (not shown) adjacent the terminal end 150. In some instances, the discharge opening 164 includes a length dimension $L_{DO}$ of between about 5 cm to about 500 cm. In other instances, the discharge opening 164 includes a length dimension $L_{DO}$ of between about 30 cm to about 60 cm. In one instance, the length dimension $L_{DO}$ is about 45 cm. In some instances, the discharge opening 164 further includes a width dimension $W_{DO}$ of between about 10 cm to about 50 cm. In other instances, the discharge opening 164 further includes a width dimension $W_{DO}$ of between about 5 cm to about 500 cm. In one instance, the width dimension $W_{DO}$ is about 40 cm.

The entirety of the upper enclosed housing 122 defines a discharge section 210, which is where material (not labeled) undergoes processing and exits the conveyor system 100. The discharge section 210 extends from axis A to the terminal end 150 of the upper housing 122. In some instances, the discharge section 210 includes a length dimension $L_{DS}$ of between about 100 cm to about 200 cm. In other instances, the discharge section 210 includes a length dimension $L_{DS}$ of between about 10 cm to about 5,000 cm. In one instance, the length dimension $L_{DS}$ is about 150 cm. In some instances, the discharge section 210 further includes a width dimension $W_{DS}$ of between about 10 cm to about 60 cm. In other instances, the discharge section 210 further includes a width dimension $W_{DS}$ of between about 5 cm to about 600 cm. In one instance, the width dimension $W_{DS}$ is about 30 cm. In some instances, the cubic volume dimension $V_{DS}$ of the discharge section 210 is between about 0.1 ft$^3$ to about 500 ft$^3$. In another instance, the cubic volume dimension $V_{DS}$ of the discharge section 210 is between about 0.5 ft$^3$ to about 50 ft$^3$. In one instance, the cubic volume dimension $V_{DS}$ of the discharge section 210 is about 2.5 ft$^3$.

Figure 5:
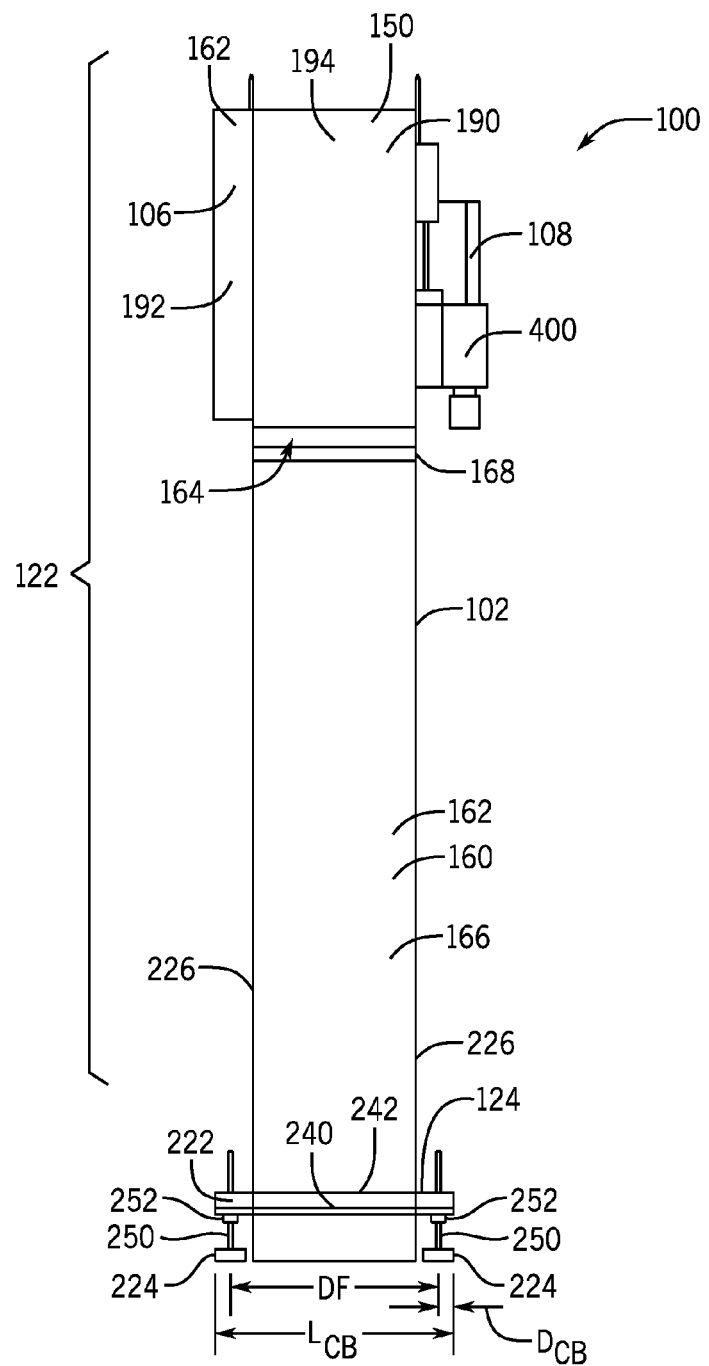
FIG. 5 is a rear plan view of the conveyor system of FIG. 1.

As shown in FIGS. 1 and 5, the support frame 124 includes a main vertical frame member 220, a horizontal cross brace 222, feet 224, and two secondary frame members 226. The vertical frame member 220 is defined by two opposing rectilinear legs 228 that each terminate at an angled flange 230. The legs 228 extend upwardly about half of the total height of the vertical frame member 220 until reaching the angled flanges 230, which flare outwardly to form a larger surface area that contacts the housing 102. In particular, the vertical frame member 220 attaches to an underside of the upper enclosed housing 122 via the angled flanges 230. The vertical frame member 220 is positioned attached adjacent the intersection of the inclined section 160 and drive unit housing 162 to provide support thereto. In one instance, the angled flanges 230 are integral or otherwise joined to the upper enclosed housing 122 in a permanent manner. In another instance, the angled flanges 230 are joined to the upper enclosed housing 122 via semi-permanent, or temporary mechanisms such as via fasteners, interlocking members, tongue/groove, and the like.

As best seen in FIG. 1, the horizontal cross brace 222 is a rigid rectilinear member 240 that includes raised edges 242 on opposing sides thereof. A longitudinal channel 242 is formed between the edges 242 and is sized to receive and support the rectilinear legs 228 of the vertical frame member 220. The horizontal cross brace 222 further includes circular holes (not labeled) there through that are shaped to receive cylindrical members 250 that are in communication with feet 224. The cylindrical members 250 protrude through the holes and are secured to an underside of the cross brace 222 via nuts 252. The cylindrical members 224 extend downwardly through the nuts and terminate at the feet 224. The feet 224 are substantially circular and provide stability to the support frame 124. In some instances, the feet 224 are spaced from each other by a distance $D_F$ of between about 10 cm to about 100 cm. In one instance, the feet 224 are spaced from each other by a distance $D_F$ of about 50 cm. In other instances, more than two feet 224 may be included for additional stability and/or spaced at different increments.

In some instances, the cross brace 222 includes a length dimension $L_{CB}$ of about 10 cm to about 500 cm. In one specific instance, the length dimension $L_{CB}$ of the cross brace 222 is about 60 cm. In some instances, the horizontal cross brace 222 is spaced from the floor 260 a distance $D_{CB}$ of between about 0 cm to about 10 cm. In one specific instance, the distance $D_{CB}$ of the horizontal cross brace 222 from the floor 260 is about 3 cm. In a further instance, the feet 224 may be omitted all together such that the cross brace 222 is disposed directly adjacent a floor 260. Further, more than one cross-brace 222 may be included for additional stability as desired.

The secondary frame members 226 are rigid members that are attached to and extend from exterior surfaces of the rectilinear legs 228 of the vertical frame member 220 toward the inclined section 160 of the housing 102. The secondary frame members 226 provide additional structural support to the support frame 124. In some instances, the secondary frame members 226 are positioned above the floor 260 a height $H_{FM}$ of between about 10 cm to about 500 cm. In one specific instance, the height $H_{FM}$ of the frame members 226 from the floor 260 is about 30 cm.

As best seen in FIGS. 1-6, exemplary conveyor belts 104a, 104b each include a conveyor frame 300, a plurality of rollers 302, two pulleys 304, and a belt 306. The conveyor belts 104a, 104b have similar cross sections, except for the differences noted below, and therefore only one of the conveyor belts 104a will be described here in detail.

The conveyor frame 300 is mounted to internal surfaces of the housing 102. The frame 300 includes two opposing longitudinal members 310 and cross-braces 312 spaced perpendicularly therefrom. The longitudinal members 310 are mounted to the interior surfaces 144 of each of the panels 138 of lower housing 120 within the belt cavity 134. The longitudinal members 310 also extend upwardly into the inclined section 160 and are mounted to opposing walls 162. Finally, the longitudinal members 310 are mounted to the walls 190 of the drive unit housing 162. Both the inclined section 160 and the drive unit housing 162 include two conveyor frames 300 to support both conveyor belts 104a, 104b.

The conveyor frame 300 further includes a plurality of cross-braces 312 that extend perpendicularly between opposing longitudinal members 310. The cross-braces 312 are rigid members that are spaced along the length of the conveyor system 100 to provide additional structural integrity to the conveyor frame 300.

Figure 11:
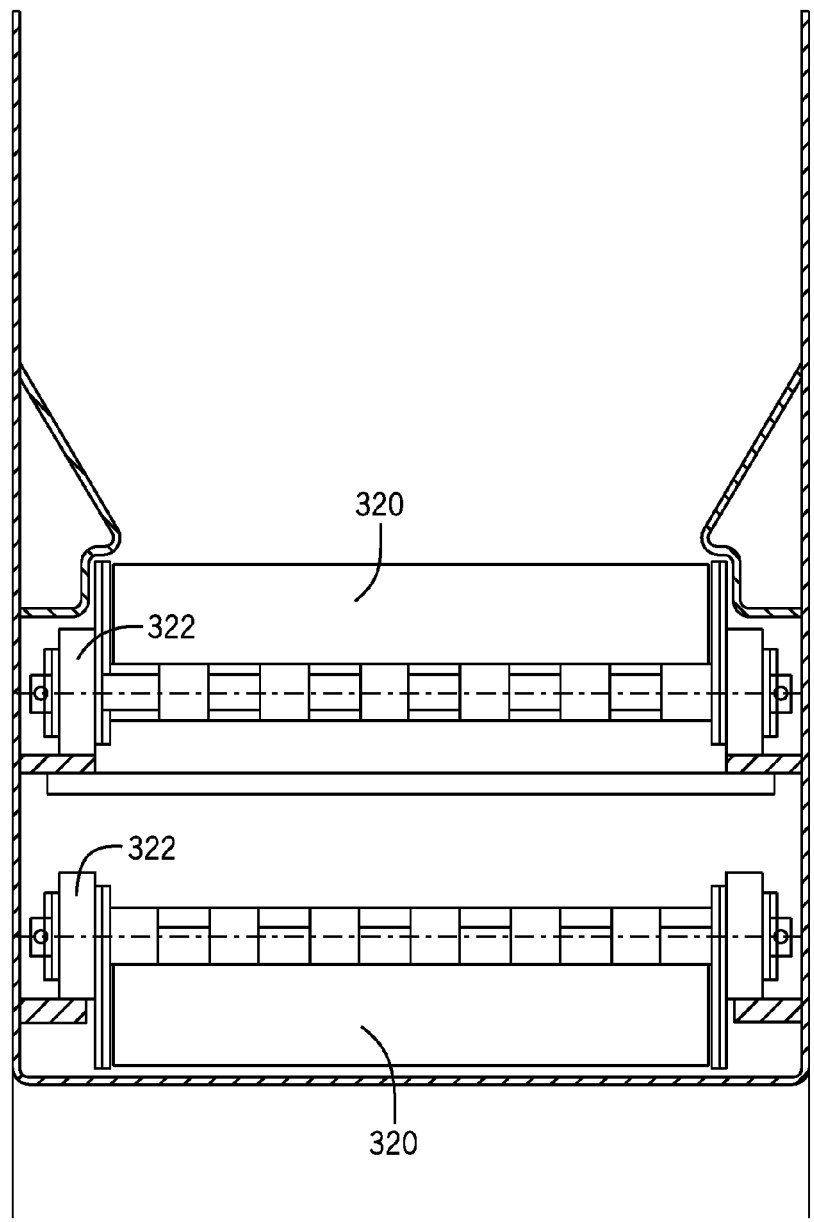
FIG. 11 is a partial cross-sectional view of the conveyor system of FIG. 2 taken along line A-A of FIG. 2, wherein portions of the conveyor system have been removed for clarity.

Referring specifically to FIGS. 11 and 12, the rollers 302 each include a roller body 320 and a shaft 322. The roller body 320 is a cylindrical solid piece of material that includes a central, axial bore 324 extending longitudinally there through. The axial bore (not labeled) is cylindrical and concentric with the outer periphery of the roller body 320, and extends through the entire length of the roller. The axial bore is designed to receive the shaft 322. In some instances, the rollers 302 include additional components such as bearings or other rotation assisting components. The roller bodies 320 freely rotate about the shaft 322 and allow weight from the belts 306 to be more evenly distributed.

As shown in FIG. 2, six upper rollers 302 are spaced adjacent to six lower rollers 302 in the lower housing 120. Similarly, six upper rollers 302 are spaced adjacent to six lower rollers 302 in both the upper section 180 and the lower section 182 of the inclined section 160 of the housing 102. In some instances, one or more rollers 302 are added to locations along the length of the conveyor system 100. In other instances, one or more rollers 302 are removed from the conveyor system 100.

Both conveyor belts 104a, 104b include two pulleys 304. In particular, the first conveyor belt 104a includes an idler pulley 330a and a drive pulley 332 and the second conveyor belt 104b includes two idler pulleys 334a, 334b. Each of the pulleys 330a, 332, 334a, 334b have a substantially similar construction with respect to each other, except for the differences discussed below.

The pulleys all include a cylindrical body 340 and a shaft 342 that extend perpendicularly between opposing walls of the conveyor system 100. The body 340 includes a central, axial bore (not labeled) extending longitudinally there through. The axial bore is cylindrical and concentric with the outer periphery of the body 340, and extends through the entire length thereof. The axial bore is designed to receive the shaft 342. In one instance, the body 340 of the pulleys include a recess (not shown) that support the belt 306 there between to assist in rotation thereof. The pulley bodies 340 are designed to freely rotate about the shaft 342 while contacting the belt 306 to guide it or take up slack. The shafts 342 of the drive pulley 332 and idler pulley 334b include a diameter parameter of between about 1 cm to about 5 cm. In one instance, the diameter parameter is about 3 cm.

No direct power is supplied to the idler pulleys 330, 334a, 334b to effectuate rotation thereof. The idler pulleys 330, 334a, 334b all operate in this manner. In one instance, it should be noted that the idler pulley 334b comprises a drive shaft that includes typical drive shaft components, such as engagement members. However, in this instance, idler pulley 334b is referred to as such because it acts in a passive manner and does not receive power from the drive system 106. The drive pulley 332 of the first conveyor belt 104a has a similar construction as the idler pulleys 330, 334a, 334b, except that the drive pulley 332 receives power from the drive unit 106, whereas idler pulleys 330, 334a do not receive power directly from the drive unit 106.

In some instances, the idler pulley 330 associated with the first conveyor belt 104a and the idler pulley 334a disposed at the proximal end of the second conveyor belt 104b each include bodies that have substantially smooth surfaces. In some instances, the drive pulley 332 and the idler pulley 334b disposed at the terminal end of the second conveyor belt 104b both include teeth 350 formed into their bodies 340 (see FIG. 7).

As shown in FIG. 1, the idler pulley 330 of the first conveyor belt 104a is disposed in the protective end cap 136 of the lower housing 120 and the drive pulley 332 is disposed in the drive unit housing 162. The first idler pulley 334a of the second conveyor belt 104b is disposed in the upper section 180 of the cubic enclosure 166 in the inclined section 160, and the second idler pulley 334b is disposed in the drive unit housing 162 adjacent the drive pulley 332 of the first conveyor belt 104a.

Figure 6:
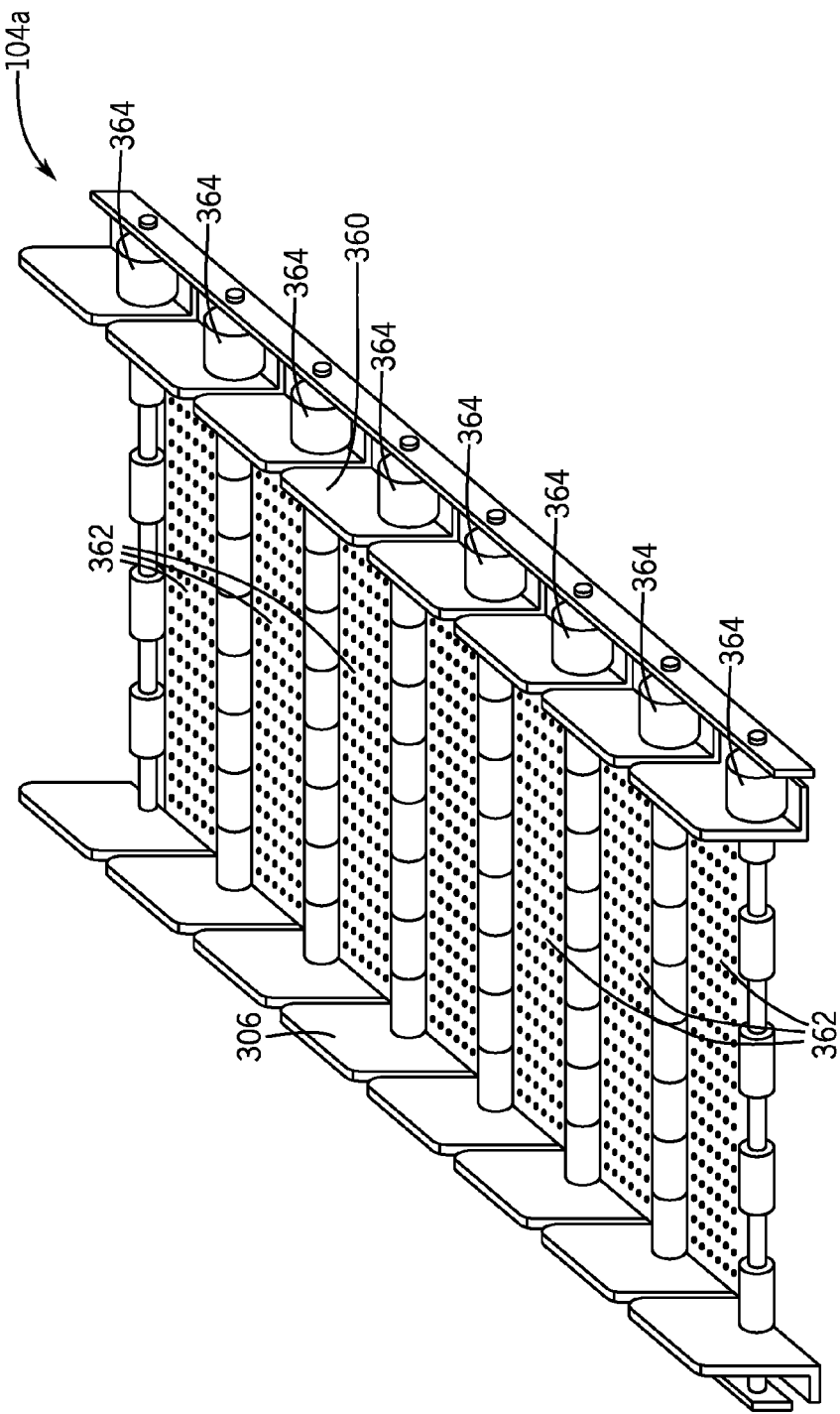
FIG. 6 is an isometric view of an exemplary conveyor belt suitable for use with the conveyor system described herein.

Now turning to FIG. 6, the belts 306 are each formed as a continuous metal body 360 that includes rigid segments 362 separated by pin members 364. In some instances, the belts 306 include slots, teeth, cleats, and/or bores to assist in the operation thereof. The belts 306 are preferably made of a metal material, and more specifically, steel.

Various belts 306 may be useful for use in the conveyor system 100 including, for example, any of the hinged steel belts supplied by Jorgensen Conveyors, Inc. (Mequon, Wis.). Suitable steel belts include the US-150 Metal Belt, the US-241 and US-241-SB Metal Belts, the US-410 and US-410-SB Metal Belts, the USA-600 and USA-601 Metal Belts, and the USA-900 and USE-901 Metal Belts. In one instance, the belt 306 of the first conveyor belt 104a includes a length dimension of about 7.8 m. In one instance, the belt 306 of the second conveyor belt 104b includes a length dimension of about 4.1 m. However, the belts 306 of both of the conveyor belts 104a, 104b may be sized according to the specific design requirements of the conveyor system 100.

Figure 7:
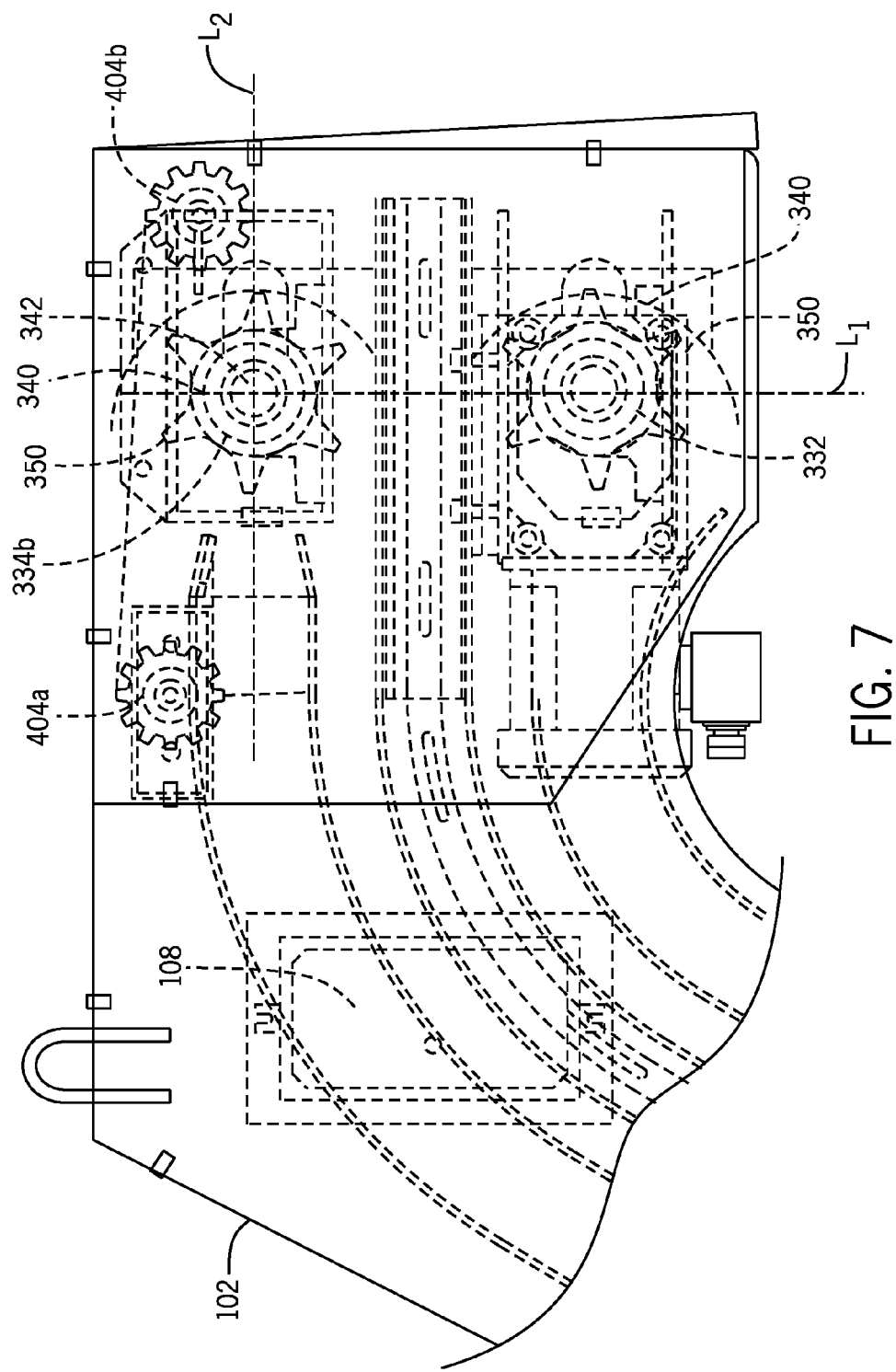
FIG. 7 is a partial right side elevational view of the conveyor system of FIG. 1, wherein portions of the conveyor system have been removed for clarity.
Figure 8:
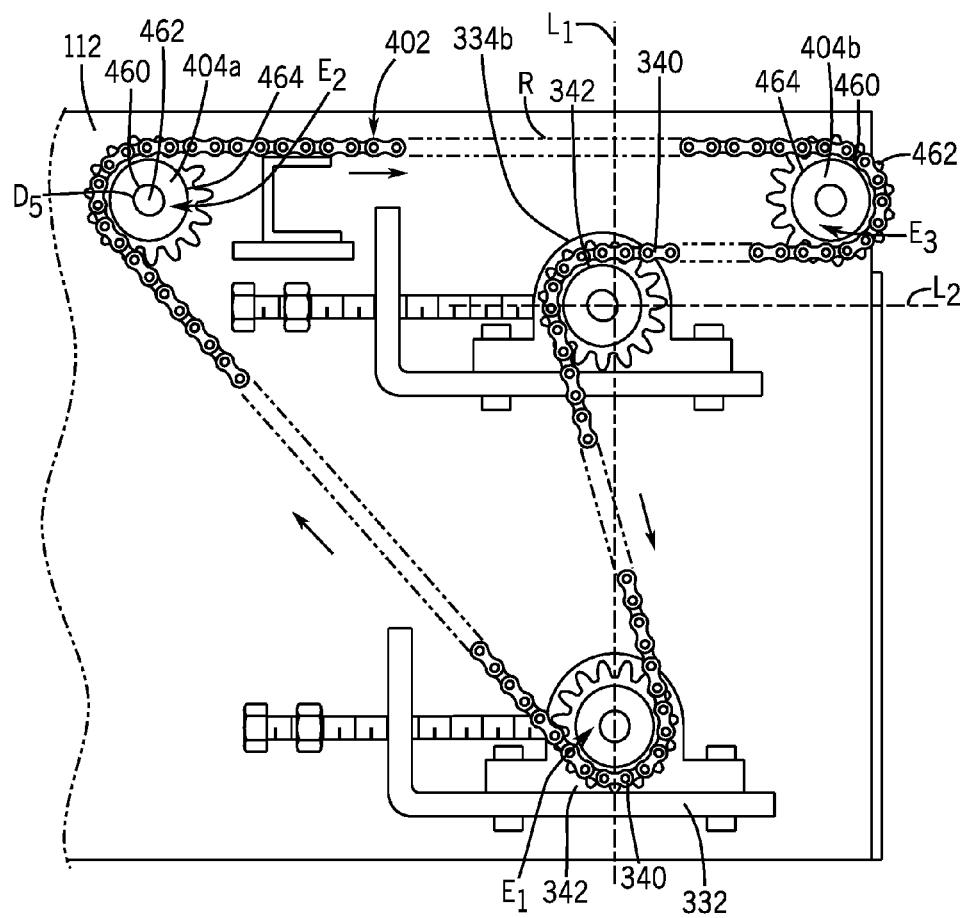
FIG. 8 is a partial right side schematic view of the conveyor system of FIG. 1, wherein portions of the conveyor system have been removed for clarity.
Figure 9:
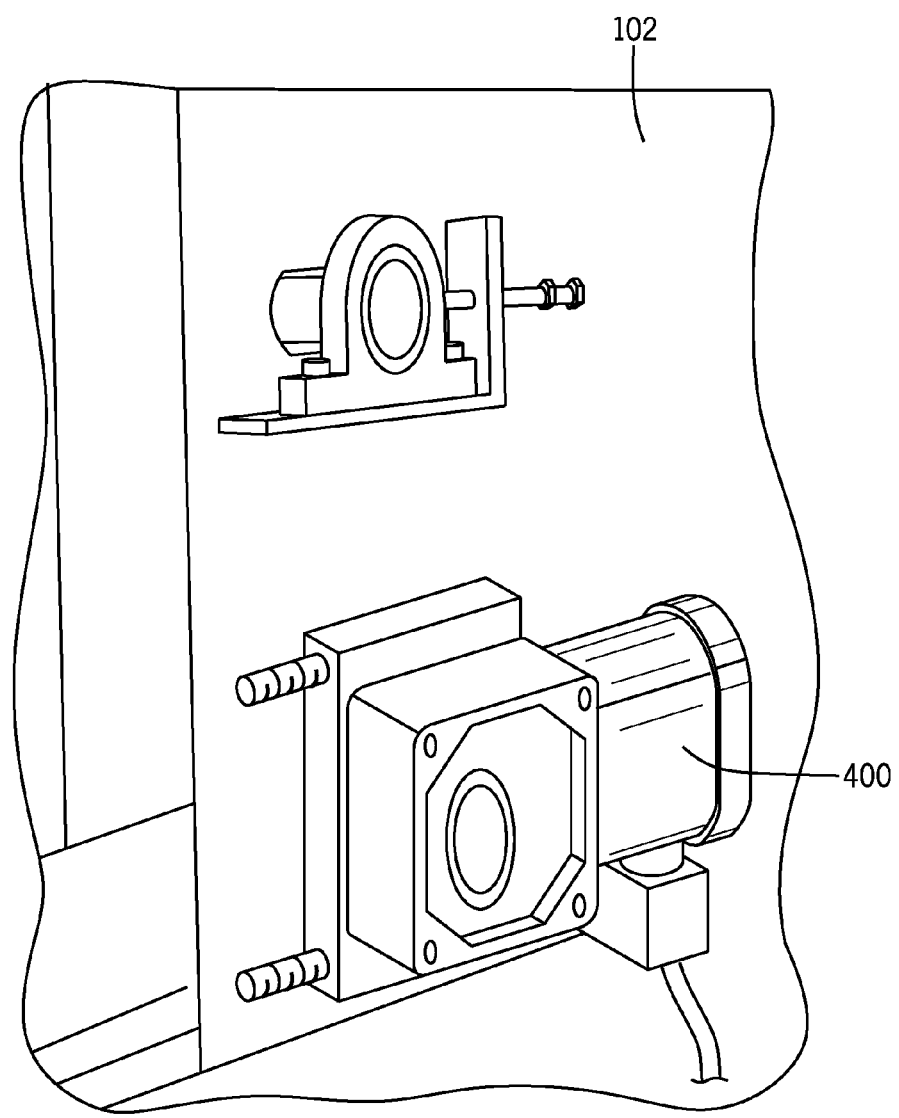
FIG. 9 is a partial left side elevational view of a motor of the conveyor system attached to the housing.

Now referring specifically to FIGS. 7-9, exemplary drive unit 106 includes a motor 400, a roller chain 402, and two sprockets 404a, 404b.

Exemplary motor 400 is generally labeled as numeral 400, although various internal components are not shown. The motor 400 is designed to convert electrical energy into mechanical energy to operate the conveyor system 100 and is specifically designed to drive only one of the conveyor belts 104a, 104b (e.g., conveyor belt 104a). In one instance, motor 400 is a gear motor mounted on a hollow shaft. The motor 400 uses magnetism generated by an electrical current to rotate a rotor that connected to a shaft. The energy transferred from the rotor to the shaft is then used to power the conveyor system 100. In particular, energy output from the motor 400 turns a series of gears in a gear train. A second shaft is connected to the series of gears in the gear train. The speed of the motor 400 is slowed while, at the same time, the torque the motor 400 generates is increased. In one instance, the gear motor is an alternating current electric motor. In another instance, the gear motor is a direct current electric motor.

The motor 400 is located in the drive unit housing 162 and is in communication with the drive pulley 332 of the first conveyor belt 104a.

The motor 400 is characterized by various operating parameters associated with the conveyor system 100. In some instances, the motor 400 includes a gear ratio of about 240 to about 1. In some instances, the motor 400 includes a frequency of rotation parameter characterized between about 1 RPM's to about 15 RPMs. In one specific instance, the frequency of rotation is about 7.5 RPM. In some instances, power generated by the motor 400 is defined by the formula of K−Hp. In one instance, the power is between K minus about 0.1 Hp to K minus about 1 Hp, where K is the load factor. In one specific instance, the power output is characterized as about K−¼ Hp.

In some instances, the torque supplied by the motor 400 is between about 100 Nm to about 500 Nm. In some instances, the overhung load of the motor 400 is defined by torque in pounds multiplied by the load factor, the result of which is divided by the radius dimension of the sprocket. In some instances, the overhung load of the motor 400 is between about 90 kg to about 450 kg. In one instance, the overhung load of the motor 400 is about 320 kg.

In some instances, a suitable motor 400 for use in the conveyor system 100 are gear motors supplied by Brother International (Bridgewater, N.J.). One specific suitable Brother International gear motor has the model number F3S30N240-BMK4A. In other instances, other types of motors 400 are employed in the conveyor system 100. For example, other suitable motors include the F3S25N240-BMH4A gearmotor supplied by Brother International, the PowerSTAR Right-angle Hypoid Gearmotor supplied by Bison Gear & Engineering Corp., the F3 series Right-angle Hollow BoreSymmetric/Compact Gearmotor supplied by Brother International, the Right Angle Helical Bevel Gearmotor supplied by Nord Drivesystems, the General Purpose Motor supplied by Leeson Electric, and the 700 Series Single Reduction Flanged Reducer supplied by Boston Gear. Other motors may be utilized having different parameters as described herein, depending on the design requirements of the conveyor system 100. For example, conveyor systems 100 that incorporate longer belts 306 may need to utilize a motor 400 with a larger power output than the ones described herein to effectively operate the conveyor system 100.

Figure 10:
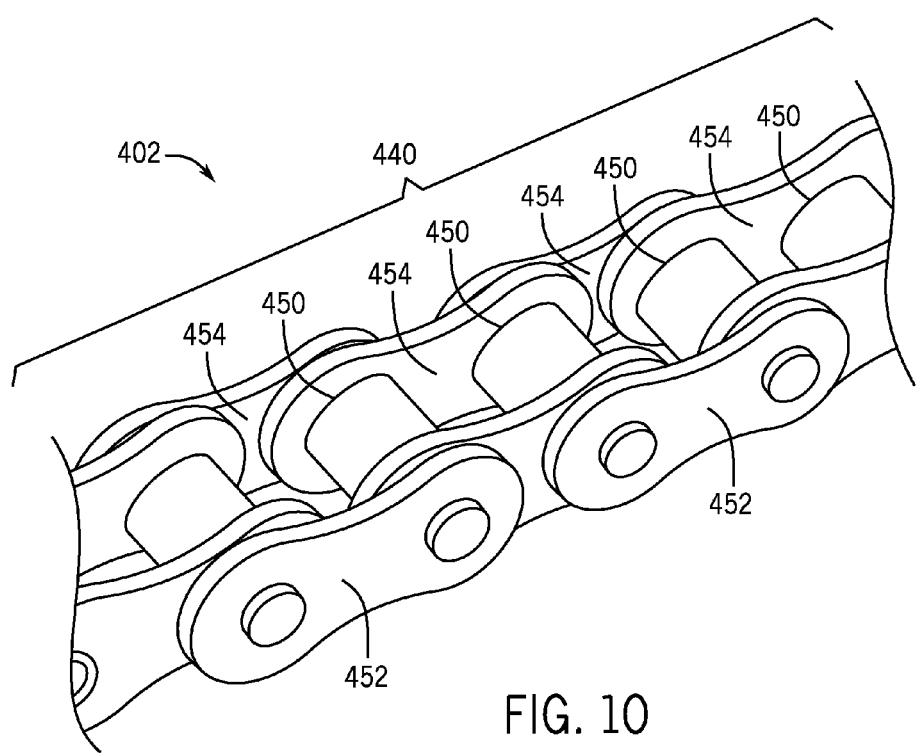
FIG. 10 is a partial isometric view of a roller chain suitable for use with the conveyor system described herein.

Referring to FIGS. 8 and 10, the drive system 106 further includes the roller chain 402, which is defined by a continuous metal chain body 440. The metal chain body 440 includes a plurality of short cylindrical rollers 450 attached via side links 452, with gaps 454 created between adjacent rollers 450.

The roller chain 402 drives the second conveyor belt 104b. The roller chain 402 is preferably metal and is characterized by an ultimate tensile strength of between about 2800 lb. to about 3400 lb and a dynamic tensile strength of between about 300 lb to about 700 lb. In one instance, the ultimate tensile strength of the roller chain 402 is about 3100 lb and the dynamic tensile strength of the roller chain 402 is about 530 lb.

Referring specifically to FIGS. 7 and 8, the sprockets 404a, 404b include a substantially flat circular body 460 in communication with a shaft 462. The body 460 of the sprockets 404a, 404b are substantially flat and rigid and include a central opening (not labeled) that receives the shaft 462. The body 460 of the sprockets 404a, 404b include radial projections 464 (e.g., teeth) extending around the circumference thereof. In some instances, between about 10 radial projections 464 to about 30 radial projections 464 extend from the body 460 of the sprockets 404a, 404b. In one instance, about 18 radial projections 464 extend from the body 460 of the sprockets 404a, 404b.

The sprockets 404a, 404b are designed to interact with the roller chain 402. In particular, the radial projections 464 of the sprockets 404a, 404b engage the gaps 454 in the links of the roller chain 402. When the sprockets 404a, 404b are turned, the roller chain 402 is pulled, which translates into mechanical force that drives the conveyor belt 104b. In some instances, the sprockets 404a, 404b include a pitch diameter dimension $D_S$ of between about 3 cm to about 10 cm. In one instance, the diameters of both sprockets 404a, 404b are substantially the same. In another instance, the diameters of both sprockets 404a, 404b are different.

The conveyor system 100 is directed via controller 108. Although specific components are not labeled, the controller 108 includes a control panel that allows an operator to specify various operating parameters about the conveyor system 100. In particular, the controller 108 is in electrical communication with the motor 400. One or more operating parameters may be selected including, for example, running speed of the conveyor belts 104a, 104b, off/on, forward/reverse belt movement, and Jam Manager, which is a mechanism to control overload. One suitable controller 108 is the UVS-Eco-Logic® Control supplied by Jorgensen Conveyors, Inc. (Mequon, Wis.).

In an exemplary configuration, the first conveyor belt 104a is disposed in a substantially horizontal orientation in the belt cavity 134 of the lower housing 120. The first conveyor belt 104a extends upwardly through the inclined section 160 before flattening out in the drive unit housing 162 and terminating adjacent the discharge opening 164. The first conveyor belt 104a extends around the idler pulley 330 disposed in the protective end cap 136 of the lower housing 120 and around the drive pulley 332 disposed in the drive unit housing 162. A plurality of rollers 302 are disposed adjacent the first conveyor belt 104a to provide support thereto.

The second conveyor belt 104b is disposed within and extends upwardly through the inclined section 160 before flattening out in the drive unit housing 162 and terminating adjacent the discharge opening 164. The second conveyor belt 104b extends around the idler pulley 334a disposed in the upper section 180 of the cubic enclosure 166 in the inclined section 160 and around the second idler pulley 334b disposed in the drive unit housing 162. A plurality of rollers 302 are disposed adjacent the first conveyor belt 104a to provide support thereto.

As shown in FIGS. 1, 2, 4, and 12, the first and second conveyor belts 104a, 104b are positioned in a "sandwich belt" manner. Surfaces of the belts 306 are positioned face-to-face with the gap 184 there between. The gap 184 is sized to firmly hold the materials sent through the conveyor system 100. In one instance, the gap 184 between the belts 306 is between about 2 in. to about 12 in. In another instance, the gap 184 between the belts 306 is about 4 in.

The roller chain 402 wraps around and engages the drive pulley 332 of the first conveyor belt 104a, the idler pulley 334b of the second conveyor belt 104b, and sprockets 404a, 404b in the manner shown in FIG. 8. The drive pulley 332, idler pulley 334b, and sprockets 404a, 404b are attached to the housing 102 and configured in a specific orientation to drive both conveyor belts 104a, 104b. Still referring to FIG. 8, the drive pulley 332 and idler pulley 334b are aligned with each other with respect to a longitudinal axis $L_1$ that extends perpendicular from the floor (not shown in FIG. 8). The sprockets 404a, 404b are positioned above an axis $L_2$ formed by the shaft 342 of the idler pulley 334b.

Still referring specifically to FIG. 8, numerous angles are formed by the roller chain 402 engagement between each of the drive pulley 332, idler pulley 334a, 334b, and sprockets 404a, 404b. A first angle of engagement $E_1$ is formed by the roller chain 402 between the drive pulley 332 and the sprocket 404a. In some instances, the first angle of engagement $E_1$ is between about 20 degrees to about 60 degrees. In one instance, the first angle of engagement $E_1$ is about 40 degrees. A second angle of engagement $E_2$ is formed by the roller chain 402 between the sprockets 404a, 404b. In some instances, the second angle of engagement $E_2$ is between about 70 degrees to about 100 degrees. In one instance, the second angle of engagement $E_2$ is about 90 degrees. A third angle of engagement $E_3$ is formed by the roller chain 402 between the sprocket 404b and the idler pulley 334. In some instances, the third angle of engagement $E_3$ is between about 10 degrees to about 30 degrees. In one instance, the third angle of engagement $E_3$ is about 20 degrees. A fourth angle of engagement $E_4$ is formed by the roller chain 402 between the idler pulley 334b and the drive pulley 332. In some instances, the fourth angle of engagement $E_4$ is between about 40 degrees to about 80 degrees. In one instance, the fourth angle of engagement $E_4$ is about 60 degrees.

The motor 400 provides power to rotate the drive pulley 332, which in turn drives the roller chain 402. The roller chain 402 travels through the conveyor system 100 in a manner shown by arrows R, depicted in FIG. 8. The roller chain 402 rotates around the drive pulley 332 and interacts with the first and second sprockets 404a, 404b such that the drive pulley 332 and first and second sprockets 404a, 404b all rotate in a clockwise direction depicted by arrow M. After leaving the second sprocket 404b, the roller chain 402 is wound back through the idler pulley 334b such that the idler pulley 334b rotates in a counterclockwise direction depicted by arrow N.

The drive pulley 332 is in communication with the first conveyor belt 104a so that the first conveyor belt 104a rotates in a clockwise manner. In this way, the motor 400 directly supplies power to the first conveyor belt 104a via the drive pulley 332. At the same time, the roller chain 402 travels through the sprockets 404a, 404b and turns the idler pulley 334b, which is in communication with the second conveyor belt 104b. In this way, the roller chain 402 drives the movement of the second conveyor belt 104b in a counterclockwise manner. Accordingly, the motor 400 configured for use in the drive system 130 provides power to both the first and second conveyors 102, 104, but in a direct and indirect manner.

In use, the motor 400 supplies power to the conveyor system, which causes the first and second conveyor belts 104a, 104b to rotate in clockwise and counterclockwise manners, respectively. The conveyor belts 104a, 104b require a minimum amount of tension to move when unloaded. In some instances, the first conveyor belt 104a requires a tension of about 55 kg. In some instances, the second conveyor belt 104b requires a tension of about 19 kg. In motion, in some instances, the conveyor belts 104a, 104b have a nominal speed at 60 Hz of 0.05 m/s, using the exemplary motor 400 described herein. Material (not shown) to be processed is placed onto the first conveyor belt 104a and is transported toward the inclined section 160. Material enters the inclined section 160 and travels into the gap 184 disposed between the surfaces of the belts 306. In many instances, the material is larger than the gap 184 and is therefore broken up and crushed as it travels through the gap 184. The material continues through the drive unit housing 162 disposed between the conveyor belts 104a, 104b before exiting the conveyor system 100 at the discharge opening 164. In some instances, the conveyor system 100 has a capacity to carry between about 1 m³/hr to about 8 m³/hr. In one specific instance, the conveyor system 100 has a capacity to carry about 5.5 m³/hr, assuming a 30 cm wide belt 306. In other instances, the conveyor system 100 has a capacity to carry between about 1 m³/hr to about 100 m³/hr.

It is envisioned that other types of drive mechanisms may be useful for use with the conveyor system 100 that operate in a similar manner to the drive unit 106 disclosed herein. In particular, the drive unit 106 supplies power to a single conveyor belt, which is mechanically linked to the second conveyor belt to drive the belts in opposite directions. For example, in one embodiment, the drive unit 106 of the conveyor system 100 includes a gear box. In another embodiment, the drive unit 106 of the conveyor system 100 includes a timing belt. In a further embodiment, the drive unit 106 of the conveyor system 100 includes other types of belts.

It should be appreciated that the conveyor system 100 may be modified in various manners that impact its operating parameters. For example, in some instances, the gap 184 may be enlarged to allow the conveyor system 100 to handle more and/or larger sized material. In some instances, the length and width dimensions of the belts 306 may be modified as well.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

To apprise the public of the scope of this invention, the following claims are made:

What is claimed is:

1. A conveyor system for controlling two conveyer belts with a single motor, the system comprising:
    a housing including at least one inclined section;
    a first conveyor belt operably connected to a drive pulley and a first idler pulley;
    a second conveyor belt operably connected to a second and third idler pulley;
    a gap between the first and second conveyor belts, the gap sized to firmly hold a material received between the first and second conveyor belts, at least a portion of the material being larger than the gap;
    a drive unit including a motor in communication with the drive pulley and a first and a second sprocket; and
    a roller chain extending between the drive pulley, the sprockets, and the third idler pulley, wherein the roller chain causes the drive pulley and the sprockets to rotate in one of a clockwise manner and a counterclockwise manner and the third idler pulley to rotate in the other of the clockwise manner and the counterclockwise manner,
    wherein the conveyor system is configured to crush the material as the material travels through the gap,
    wherein the first and second conveyor belts are enclosed in a cubic enclosure of the inclined section, and
    wherein the inclined section is pitched at an angle of between about 30 degrees to about 100 degrees; and
    wherein an angle of engagement, $E_3$, is formed by the roller chain between the second sprocket and the third idler pulley, wherein $E_3$ is between about 10 degrees to about 30 degrees.

2. The system of claim 1, wherein at least one of the first or second conveyor belts is a hinged steel belt.

3. The system of claim 1, wherein the motor is a gear motor mounted on a hollow shaft.

4. The system of claim 1, wherein the power output of the motor is characterized as about K-¼ Hp.

5. The system of claim 1, wherein the first and second conveyor belts are each confined by and supported by a frame that is attached to the housing.

6. The system of claim 1, wherein the motor rotates the drive pulley, which engages the first conveyor belt to directly supply power thereto.

7. The system of claim 1, wherein the roller chain is rotated by the drive pulley and causes the third idler pulley to rotate and engage the second conveyor belt to supply indirect power thereto.

8. The system of claim 1, wherein an angle of engagement, $E_4$, is formed by the roller chain between the third idler pulley and the drive pulley, wherein $E_4$ is between about 40 degrees to about 80 degrees.

9. The system of claim 1, wherein the first and second sprockets are disposed on opposing sides of the third idler pulley.

10. The system of claim 1, wherein the first and second sprockets are disposed on opposing sides of both the third idler pulley and the drive pulley.

11. The system of claim 1, wherein an angle of engagement, $E_1$, is formed by the roller chain between the drive pulley and the first sprocket, wherein $E_1$ is between about 20 degrees to about 60 degrees, and wherein an angle of engagement, $E_4$, is formed by the roller chain between the third idler pulley and the drive pulley, wherein $E_4$ is between about 40 degrees to about 80 degrees.

12. The system of claim 1, wherein the gap is between about 2 inches to about 12 inches.

13. The system of claim 1, wherein the material is larger than the gap.

14. The system of claim 13, wherein the material is broken up or crushed as it travels through the gap.

15. The system of claim 1, wherein the sprockets are disposed above a horizontal axis of the idler pulley.

16. A conveyor system for controlling two conveyer belts with a single motor, the system comprising:
- a housing including at least one inclined section;
- a first conveyor belt operably connected to a drive pulley and a first idler pulley;
- a second conveyor belt operably connected to a second and third idler pulley;
- a drive unit including a motor in communication with the drive pulley and a first and a second sprocket; and
- a roller chain extending between the drive pulley, the sprockets, and the third idler pulley, wherein the roller chain causes the drive pulley and the sprockets to rotate in one of a clockwise manner and a counterclockwise manner and the third idler pulley to rotate in the other of the clockwise manner and the counterclockwise manner,
- wherein the drive pulley is disposed along the same longitudinal axis as the third idler pulley.

17. A method of operating a sandwich belt conveyor system, the steps comprising:
- providing a housing having an inclined section of greater than about 50 degrees and a discharge opening at a terminal end;
- providing a first and a second conveyor belt, wherein the first conveyor belt extends substantially the entire length of the housing and terminates at the discharge opening and the second conveyor belt is positioned in the inclined section and terminates at the discharge opening, and wherein a gap is formed between the first and second conveyor belts, the gap sized to firmly hold a material received between the first and second conveyor belts;
- supplying power directly to the first conveyor belt via a motor to rotate the first conveyor belt in one of a clockwise direction and a counterclockwise direction;
- supplying power indirectly to the second conveyor belt via a roller chain to rotate the second conveyor belt in the other of a clockwise direction and the counterclockwise direction;
- transporting the material on the first conveyor belt toward the inclined section and into the gap; and
- crushing the material as it travels through the gap; and
- wherein an angle of engagement, $E_1$, is formed by the roller chain between the drive pulley and the first sprocket, wherein $E_1$ is between about 20 degrees to about 60 degrees.

18. The method of claim 17, wherein the roller chain engages a drive pulley, two sprockets, and an idler pulley to move both the first and second conveyor belts.

19. The method of claim 17, wherein the drive pulley and the idler pulley are disposed along a longitudinal axis that is perpendicular to an ambient floor surface.

20. The method of claim 17, wherein an angle of engagement, $E_2$, is formed by the roller chain between the first and second sprockets, wherein $E_2$ is between about 70 degrees to about 100 degrees.

21. The method of claim 17, wherein an angle of engagement, $E_3$, is formed by the roller chain between the second sprocket and the third idler pulley, wherein $E_3$ is between about 10 degrees to about 30 degrees.

22. The method of claim 17, wherein an angle of engagement, $E_4$, is formed by the roller chain between the third idler pulley and the drive pulley, wherein $E_4$ is between about 40 degrees to about 80 degrees.

23. A conveyor system for controlling two conveyer belts with a single motor, the system comprising:
- a housing including at least one inclined section;
- a first conveyor belt operably connected to a drive pulley and a first idler pulley;
- a second conveyor belt operably connected to a second and third idler pulley;
- a gap between the first and second conveyor belts, the gap sized to firmly hold a material received between the first and second conveyor belts;
- a drive unit including a motor in communication with the drive pulley and a first and a second sprocket; and
- a roller chain extending between the drive pulley, the sprockets, and the third idler pulley, wherein the roller chain causes the drive pulley and the sprockets to rotate in one of a clockwise manner and a counterclockwise manner and the third idler pulley to rotate in the other of the clockwise manner and the counterclockwise manner;
- wherein an angle of engagement, $E_2$, is formed by the roller chain between the first and second sprockets, wherein $E_2$ is between about 70 degrees to about 100 degrees.

24. The system of claim 23, wherein an angle of engagement, $E_1$, is formed by the roller chain between the drive pulley and the first sprocket, wherein $E_1$ is between about 20 degrees to about 60 degrees.

25. The system of claim 23, wherein an angle of engagement, $E_3$, is formed by the roller chain between the second sprocket and the third idler pulley, wherein $E_3$ is between about 10 degrees to about 30 degrees.

26. The system of claim 23, wherein an angle of engagement, $E_4$, is formed by the roller chain between the third idler pulley and the drive pulley, wherein $E_4$ is between about 40 degrees to about 80 degrees.

27. A method of operating a sandwich belt conveyor system, the steps comprising:
- providing a housing having an inclined section of greater than about 50 degrees and a discharge opening at a terminal end;
- providing a first and a second conveyor belt, wherein the first conveyor belt extends substantially the entire length of the housing and terminates at the discharge opening and the second conveyor belt is positioned in the inclined section and terminates at the discharge opening;
- supplying power directly to the first conveyor belt via a motor to rotate the first conveyor belt in one of a clockwise direction and a counterclockwise direction; and
- supplying power indirectly to the second conveyor belt via a roller chain to rotate the second conveyor belt in the other of a clockwise direction and the counterclockwise direction,
- wherein the sprockets are disposed above a horizontal axis of the idler pulley.

28. The method of claim 27, wherein the drive pulley and the idler pulley are disposed along a longitudinal axis that is perpendicular to an ambient floor surface.

\* \* \* \* \*